United States Patent Office

3,506,594
Patented Apr. 14, 1970

3,506,594
MICROSPHERICAL ZEOLITIC MOLECULAR SIEVE COMPOSITE CATALYST AND PREPARATION THEREOF
Walter L. Haden, Jr., Metuchen, and Frank J. Dzierzanowski, Somerset, N.J., assignors to Engelhard Minerals & Chemicals Corporation, Township of Woodbridge, N.J., a corporation of Delaware
No Drawing. Continuation-in-part of applications Ser. No. 416,925, Dec. 8, 1964, and Ser. No. 698,400, Jan. 17, 1968. This application June 20, 1968, Ser. No. 738,384
Int. Cl. B01j *11/40;* C01b *33/28*
U.S. Cl. 252—455  9 Claims

ABSTRACT OF THE DISCLOSURE

Raw kaolin clay, calcined kaolin clay or a mixture thereof is mixed with water to form a slurry which is spray dried. The resulting microspheres are calcined at about 1800° F. and the calcined microspheres are slurried in an aqueous sodium hydroxide solution of predetermined composition. The slurry is heated and agitated until a faujasite-type zeolitic molecular sieve crystallizes. After crystallization, the microspheres are separated from the mother liquor (a sodium silicate solution), ion-exchanged and heat-activated.

RELATED APPLICATIONS

This application is a continuation-in-part of our co-pending applications Ser. No. 416,925, filed Dec. 8, 1964, now U.S. 3,391,994, entitled "Method For Producing Faujasite-Type Zeolites" and Ser. No. 698,400, filed Jan. 17, 1968 entitled "Fluid Catalyst and Preparation Thereof."

BACKGROUND OF THE INVENTION

Catalysts for fluid hydrocarbon conversion processes, e.g., cracking catalysts, are usually supplied in the form of microspheres. The microspheres should possess certain physical properties among which are hardness (attrition-resistance). Particles of cracking catalysts must also possess adequate activity and selectivity as well as thermal and steam stability.

It is known that certain catalyst composites containing a crystalline zeolitic molecular sieve, especially an ion-exchanged zeolite of the faujasite-type, possess desirable activity, selectivity and thermal and steam stability. Such catalysts have been obtained by spraying slurries of preformed zeolitic molecular sieve crystals, such as crystals of zeolite Y, with dilute silica hydrosols or alumina-silica hydrosols. Catalysts obtained by such processing are expensive since the raw material and production costs are high.

It has also been suggested to form zeolitic molecular sieve bodies directly in the size and shape of preformed reaction masses and thereby reduce processing costs. When using this general approach, a mixture of crystalline zeolites may be obtained, the mixture including crystalline zeolites of relatively small pore diameter. See U.S. 3,366,578 to Edward Michalko. The presence of a small pore diameter crystalline zeolite such as zeolite B or zeolite A is undesirable, however, in catalyst products. This is especially true when the small diameter zeolite crystallizes to the exclusion of sodium zeolite X or sodium zeolite Y. However, particles composed substantially completely of zeolitic molecular sieve are generally too active for use in conventional cracking catalysts. Therefore, the zeolitic molecular sieve is usually associated with a matrix or diluent, preferably one that imparts desirable hardness and stability to the product.

In efforts to produce fluid zeolitic molecular sieve catalyst composites at a reduced cost by employing preformed reaction particles, difficulty has also been experienced in obtaining crystalline zeolitic particles of desired hardness. Some of the catalysts are initially sufficiently hard but after the particles are subjected to prolonged attrition they become softer. Other catalysts are undesirably soft even when fresh.

THE INVENTION

Accordingly, an object of this invention is to provide a simple method for making a microspherical crystallline zeolitic molecular sieve catalyst of outstanding hardness from preformed bodies.

Another object is to provide a method for making such a catalyst at a reduced cost.

A specific object is to prepare mechanically strong microspherical catalyst particles containing a desired zeolitic molecular sieve as a constituent, the particles being substantially free from other crystalline species including small pore diameter zeolite crystalline molecular sieves.

This invention results from the discovery that kaolin clay which has been thermally treated under certain conditions reacts with dilute caustic solution to produce a crystalline faujasite-type zeolite, and that such reaction, properly controlled, may be utilized to form crystalline zeolite catalyst composites which possess a spectrum of desirable properties.

Stated briefly, in accordance with this invention, a fluid microspherical crystalline zeolitic catalyst composite is obtained by spray drying an aqueous slurry containing an aluminum silicate selected from the group consisting of raw (hydrated) kaolin clay, calcined amorphous kaolin clay and mixtures thereof, and calcining the resulting spray dried microspheres at a temperature and for a time such that the aluminum silicate material in the microspheres undergoes the characteristic kaolin exotherm. The microspheres are mixed with dilute sodium hydroxide solution to form a slurry that is sufficiently fluid to be agitated. The slurry is subjected to hydrothermal treatment under agitation and without permitting substantial dehydration to take place until a faujasite-type zeolie (zeolite X or zeolite Y) crystallizes, the crystallization being terminated before zeolite B forms to an appreciable extent.

The crystallized particles are separated from the mother liquor then ion-exchanged to replace sodium ions with suitable cations, the selection of which is within the skill of the art. Prior to use or during use, the ion-exchanged microspheres are thermally activated.

A feature of the process of the invention is that faujasite is crystallized in situ from preformed anhydrous aluminum silicate microspheres consisting essentially of calcined kaolin clay that has undergone the characteristic kaolin exotherm. Another feature of the process is that the hydrothermal treatment is terminated after substantially the maximum amount of synthetic faujasite has crystallized. If hydrothermal treatment is continued after this takes place, zeolite B will begin to crystallize. Simultaneously the quantity of faujasite will decrease. Eventually all of the crystalline constituent will be present as sodium zeolite B.

DETAILED DESCRIPTION

As mentioned, the starting materials employed in carrying out the invention include kaolin clay which may be raw, calcined or a mixture of raw and calcined clay. The term "raw" kaolin clay refers to a naturally-occurring kaolin clay which contains the water of crystallization (hydration) normally present in the clay.

Low-iron, high purity raw kaolin is preferred. The use of a fine size plastic raw clay, i.e., a clay containing a substantial quantity of submicron size particles, is preferred.

The term "kaolin clay" as used herein embraces clays, the predominating mineral constituent of which is kaolinite, halloysite, nacrite, dickite, anauxite and mixtures thereof.

The calcined clay starting material may be obtained by calcining a high purity, low iron kaolin at a product temperature within the range of about 1000° F. to 2200° F., preferably 1350° F. to 1850° F. Mixtures of clays calcined at temperatures within these ranges may be employed. When calcining clay at elevated temperature, e.g., temperature appreciably above 1800° F., the duration of the calcination should be limited to avoid the formation of new crystalline phases. The calcined clay should be amorphous when tested by standard X-ray diffraction although diffraction maxima characteristic of crystalline impurities such as anatase may be present. In other words, the calcined clay should produce an X-ray diffraction pattern free from strong peaks characteristic of high temperature alumina, silica or aluminum silicate crystalline phases.

The use of raw clay is a desirable starting material since it leads to the production of firm microspheres that tend to maintain their form before they are hardened by calcination. By using calcined kaolin clay, especially clay which has been calcined under conditions of temperature and time sufficient to effect substantial dehydration of the clay, the catalyst product may be more porous than the product would be if all of the starting clay were raw plastic kaolin clay. Therefore, to control porosity, a mixture of raw and calcined clay is recommended.

Suggested proportions are from 0 to 200 parts by weight calcined kaolin clay (moisture-free basis) to 100 parts by weight of raw, hydrated kaolin.

A water-soluble grade of sodium silicate may be employed to bind the microspheres and to maintain them in coherent form during drying, calcining, reaction and crystallization. The binder may be used in amount up to about 15% anhydrous sodium silicate, based on the weight of clay or clay mixture.

Water is employed in sufficient quantity to provide a fluid, sprayable slurry. Recommended is the use of sufficient water to obtain a slurry containing from about 50% to 60% solids.

Other ingredients such as, for example, combustible fillers, may also be present in the slurry.

Several procedures can be followed in mixing the ingredients to form the slurry. One procedure is to dry blend the finely divided solids, add the water and then the binder solution. Other sequences may be employed. The components can be mechanically worked together or individually to produce desired viscosity characteristics.

Spray dryers with countercurrent, cocurrent or mixed countercurrent and cocurrent flow of slurry and hot air can be employed to produce the microspheres. The air may be heated electrically or by other indirect means. Combustion gases obtained by burning hydrocarbon fuel in air can be used.

Spray drying results in the evaporation of water from droplets of the slurry and the formation of microspheres. Microspheres about 20 to 150 microns in equivalent spherical diameter are desired for most catalytic operations using fluidized contact masses.

Using a cocurrent dryer, air inlet temperatures to 1200° F. may be employed when the clay feed is charged at a rate sufficient to produce an air outlet temperature within the range of 250° F. to 600° F. At these temperatures, free moisture is removed from the slurry without removing water of hydration (water of crystallization) from the raw clay ingredient. Dehydration of some or all of the raw clay during spray drying is, however, within the scope of the invention.

The microspheres, or a desired size fraction of the microspheres, are heated at a temperature within the range of about 1600° F. to about 2200° F., preferably within the range of about 1750° F. to 1850° F. Preferably the calcination is carried out for a time such that when the calcined microspheres are tested by standard differential thermal analysis (DTA), the microspheres do not exhibit a substantial exothermic peak at about 1800° F. In other words, the microspheres are calcined under conditions such that any clay which has not undergone the kaolin exotherm before use, undergoes the exotherm after after the microspheres have been formed. Preferably, the clay material in the microspheres should not have passed completely through the exotherm during heat treatment since difficulty may be experienced in crystallizing the desired zeolite when the clay is in this condition. Thus, the calcined microspheres preferably exhibit a slight exothermic reaction at about 1800° F. When the microspheres have been prepared without any raw kaolin clay or metakaolin, the calcination may be carried out at lower temperature, e.g., 700° F. to 1600° F., for a time sufficient to dehydrate the microspheres.

The kaolin endotherm and exotherm can be readily determined by differential thermal analysis (DTA), using the technique described in Ralph E. Grim's "Clay Mineralogy," page 203, published by McGraw Hill Book Company, Inc. (1953).

At this point of the process, the microspheres are amorphous to X-rays except that peaks characteristic of crystalline impurities such as anatase may be present in X-ray diffraction patterns.

The microspheres are reacted with an aqueous alkaline liquid in which they are suspended, the liquid having a composition predetermined to result in the crystallization of a desired percentage of faujasite zeolite molecular sieve. Only a portion of the constituents of the calcined microspheres reacts to form the zeolitic molecular sieve and thus a composite of crystalline sieve and an amorphous residue is present in the crystallized microspheres. Generally speaking, after crystallization the microspheres should contain above about 15% crystalline faujasite-type zeolite, most preferably above 20% zeolite. The term "faujasite-type zeolite" embraces zeolite X and zeolite Y. Preferably, a high-silica form of sodium Y is crystallized, especially sodium zeolite Y having a $SiO_2/Al_2O_3$ molar ratio in excess of 4.0. X-ray diffraction techniques that may be used to estimate zeolite quantity, distinguish zeolite X from zeolite Y, and determine the silica-to-alumina molar ratios of zeolite Y appear in Ser. No. 698,400 (supra).

The aqueous alkaline solution must be employed in amount adequate to form a suspension sufficiently fluid to be stirred and containing sufficient $Na_2O$ at an operable concentration to crystallize the faujasite zeolite. Sodium hydroxide solutions of about 12% to 16% concentration (w./w.) are recommended. Solutions of 13% to 15% concentration are preferred. Sufficient solution is used to provide from about 0.5 to 1.0 mole $Na_2O$ per mole $Al_2O_3$ in the microspheres. When the concentration of $Na_2O$ in the treating liquid is too low, the zeolite may not crystallize. When the concentration is too high, there may be insufficient liquid to produce a fluid suspension without employing a $Na_2O/Al_2O_3$ molar ratio that is excessively high and results in a zeolite having an undesirably low $SiO_2/Al_2O_3$ molar ratio.

The microspheres are reacted with the sodium hydroxide solution in which they are immersed while the suspension is agitated and maintained at a temperature within the range of about 65° F. to about 130° F. Crystallization does not take place during this phase of the hydrothermal treatment. Excellent results have been obtained at a temperature of 100° F. for 24 hours.

To crystallize the zeolite, the temperature of the suspension is increased to about 150° F. to 200° F. During the crystallization, means should be provided to prevent substantial change in concentration due to loss of water from the system. This may be done, for example, by using a closed reactor, by providing the reactor with a water-cooled jacket to condense water that evaporates, by covering the aqueous suspension with a layer of oil or, when operating in an open reactor, by adding water to replace that lost by evaporation. When using oil to control evaporation, the impeller used to agitate the system should be well below the oil layer in order to maintain the oil as a distinct upper layer.

As described in detail in Example II, a portion of the silica content of the calcined microspheres dissolves in the caustic reaction liquid during the hydrothermal treatment. As a result, the crystallized microspheres are present in a sodium silicate mother liquor. After crystallization, the microspheres are separated from this mother liquor and subsequently they are ion-exchanged.

EXAMPLE I

A fluid zeolitic molecular sieve was produced, in accordance with this invention, by the following procedure.

Three hundred and seventy-eight parts by weight of "Hydrite UF" was blended with 126 parts by weight of "Satintone #1," 27 parts by weight of "Satintone #2," 28.0 parts by weight of "N"® brand sodium silicate and 436 parts by weight distilled water. "Satintone #2" is a commercial metakaolin pigment obtained by thermally dehydrating high purity kaolin clay under conditions such that the clay undergoes an endothermic reaction associated with the loss of chemically held water but does not pass through the kaolin exotherm. "Satintone #1" is also a commercial calcined clay pigment and is produced by calcination at higher temperature than used to prepare metakaolin; the clay undergoes the exothermic reaction in the preperation of this pigment. Typical properties of the calcined clay pigments are reported in Ser. No. 698,400. "Hydrite UF" is a fine size fraction of water-washed, low iron kaolin clay. "N"® sodium silicate contains 38% solids and has a $Na_2/SiO_2$ weight ratio of 1:3.2.

The ingredients were thoroughly mixed with a "Lightnin' Mixer," producing a fluid slip containing 56% solids and having a density of 1.5 kg./l.

The slip was spray dried in a 5 x 5 ft. gas-fired spray dryer using an atomizer wheel speed of 15,760 r.p.m. Air inlet and out temperatures were approximately 1100° F. and 450° F., respectively.

The minus 60 mesh (Tyler) fraction of the microspheres were calcined in a muffle furnace at 1800° F. for 2 hours to remove chemically bonded water from the raw clay and to cause the raw clay and the Satintone #2 calcined clay to undergo the kaolin exotherm. (The "Satintone #1" had already been dehydrated and had undergone the exotherm.)

Sodium hydroxide pellets (23.6 gm.) were dissolved in 144.0 ml. of distilled water. After the resulting 14% solution had cooled to about 105° F., 100 gm. of the microspheres were slowly added to the caustic solution in a 3-neck round bottom flask. The flask was fitted with a thermometer and a water-cooled condenser through which an agitator extended with the impeller near the base of the flask. The fluid mixture was maintained at 100° F. ±20° F. for 24 hours while the agitator was in operation. After 22 hours of mixing at 100° F., the temperature was raised to 180° F. and maintained at that temperature while agitation was continued. Samples were periodically removed from the flask with a pipette. The samples were filtered in Buchner funnels and washed with distilled water and dried.

The sample that had been crystallized by heating at 180° F. for 30 hours contained 16.7% sodium zeolite Y having a $SiO_2/Al_2O_3$ mole ratio of 5.0. A trace of zeolite B (estimated at 2%) was also present.

The crystallized microspheres were exchanged by percolation in a 6½" chromatography column with a 1N aqueous solution of ammonium nitrate. The ratio of $NH_4+$ in solution per equivalent of $Na+$ in the microspheres was about 1.8. After the exchange, the product was washed with distilled water to remove entrained exchange solution. The ion-exchanged microspheres were dried at 200° F. for 18 hours.

A sample of 100–270 mesh (Tyler) microspheres that had been ion-exchanged with ammonium nitrate was activated by calcination in a muffle furnace at 1100° F. for 4 hours.

The attrition-resistance of the 200–270 mesh fraction of the calcined catalyst was measured by the following procedure.

A volume of the heat-treated catalyst (0.661 cc.) and 0.5 g. of 14/20 mesh (U.S. Standard Sieve) silica sand were placed in a 2 cc. vial of a Wig-L-Bug grinding mill and the mill was operated for 5 seconds. (The Wig-L-Bug grinding mill is a product of Spex Industries and is described in Catalog No. 5000 of that company.) The sample was then screened and the percentage of minus 325 mesh material was reported as the percent weight loss.

The test was repeated in 5 second increments on the plus 325 mesh portions of the remainder of the sample. A plot of percent weight loss vs. time was obtained. The slope of curve at 20% loss was designated the "attrition rate."

The attrition rate for the experimental catalyst was 1½%/sec., which rate is comparable to that of the most attrition-resistant zeolitic fluid catalyst commercially available.

EXAMPLE II

The procedure of Example I was carried out on a larger scale. Analysis of intermediates, mother liquid and the catalyst product were made.

After crystallization for 26½ hours at about 180° F., the product contained 22.6% sodium zeolite Y having a $SiO_2/Al_2O_3$ mole ratio of 4.53. The dried intermediate had a L.O.I. (at 1800° F.) of 26.98% and had the following analysis (volatile-free weight basis): $Na_2O$, 6.61%; $Al_2O_3$, 56.64%; $SiO_2$, 32.94%; $TiO_2$, 2.53%; $Fe_2O_3$, 0.67%.

The $SiO_2/Al_2O_3$ molar ratio of this product was therefore about 1/1. Since the $SiO_2/Al_2O_3$ molar ratio of the calcined microspheres was about 2/1, about half of the silica in the microspheres had been extracted and passed into the mother liquor during the preparation of the intermediate. This was confirmed by an analysis of the mother liquor which was found to have a $Na_2O$ concentration of 86 g./l., $Al_2O_3$ concentration of 1.66 g./l. and $SiO_2$ concentration of 172 g./l.

After ion exchange, the product contained (volatile-free weight basis) 1.02% $Na_2O$ by weight; $SiO_2$, 35.10%; $Al_2O_3$, 60.35%; $Fe_2O_3$, 0.68%, $TiO_2$, 2.62%.

The cracking catalyst obtained by calcining the ammonium exchange microspheres had a bulk density of 0.695 kg./l., an attrition rate of 2.6%/sec. and had outstanding activity and selectivity when tested by the CAT–D cracking test.

Thus, fluid microspheres of outstanding hardness and desirable composition for catalytic cracking purposes were inexpensively obtained from microspheres composed of calcined kaolin clay.

All X-ray diffraction data mentioned herein refers to values obtained by the procedure and with the equipment described in copending application Ser. No. 698,400.

We claim:
1. A method for preparing a zeolitic catalyst which comprises providing coherent spray dried anhydrous aluminum silicate microspheres consisting essentially of calcined kaolin clay substantially all of which has undergone the kaolin exotherm, slurrying said calcined microspheres in an aqueous solution of sodium hydroxide containing at least 0.5 mol $Na_2O$ per mole $Al_2O_3$ in the microspheres, subjecting the resulting slurry to hydrothermal treatment with agitation while preventing sub- stantial change in concentration due to loss of water until synthetic faujasite crystallizes, silica being extracted from the microspheres during said hydrothermal treatment and forming a sodium silicate mother liquor, separating the crystallized microspheres from the mother liquor and ion-exchanging the microspheres to reduce the sodium content thereof.

2. A fluid cracking catalyst obtained by the method of claim 1.

3. In a method for producing a zeolitic catalyst, the steps which comprise forming an aqueous slurry comprising a particulate aluminum silicate material selected from the group consisting of hydrated kaolin clay, calcined kaolin clay and mixtures thereof, spraying said mixture into hot air to form microspheres, calcining said microspheres at a temperature and for a time such that any hydrated kaolin clay is substantially completely dehydrated and undergoes the characteristic kaolin clay exotherm, slurrying the calcined microspheres in an aqueous solution of sodium hydroxide containing at least about 0.5 mole $Na_2O$ per mole $Al_2O_3$ in the microspheres, subjecting the microspheres to hydrothermal treatment without dehydration while they are being agitated at a temperature and for a time such that synthetic faujasite crystallizes, silica being extracted from the microspheres during the hydrothermal treatment and forming sodium silicate mother liquor, and separating the crystallized microspheres from the mother liquor.

4. The method of claim 3 wherein the hydrothermal treatment is terminated before a substantial quantity of sodium zeolite B crystallizes.

5. The method of claim 3 wherein said aqueous slurry comprising said particulate aluminum silicate contains a small amount of sodium silicate, the amount of sodium silicate, on an anhydrous weight basis, being up to 15% based on the weight of said aluminum silicate.

6. The method of claim 3 wherein said sodium hydroxide solution has a concentration of 12% to 16%.

7. The method of claim 4 wherein said hydrothermal treatment is carried out by initially maintaining said slurry at a temperature within the range of about 65° F. to about 130° F. and then heating said slurry at a temperature below 200° F.

8. The method of claim 3 wherein said microspheres are calcined at a temperature within the range of 1750° F. to 1850° F. before the microspheres are slurried in said aqueous sodium hydroxide solution.

9. The method of claim 6 wherein said particulate aluminum silicate material consists of hydrated kaolin clay.

References Cited

UNITED STATES PATENTS

| | | | |
|---|---|---|---|
| 3,234,147 | 2/1966 | Drost et al. | 252—455 |
| 3,367,886 | 2/1968 | Haden et al. | 252—455 |
| 3,391,994 | 7/1968 | Haden et al. | 23—112 |
| 3,433,587 | 3/1969 | Haden et al. | 23—112 |

DANIEL E. WYMAN, Primary Examiner

C. F. DEES, Assistant Examiner

U.S. Cl. X.R.

23—112